Figure 12:
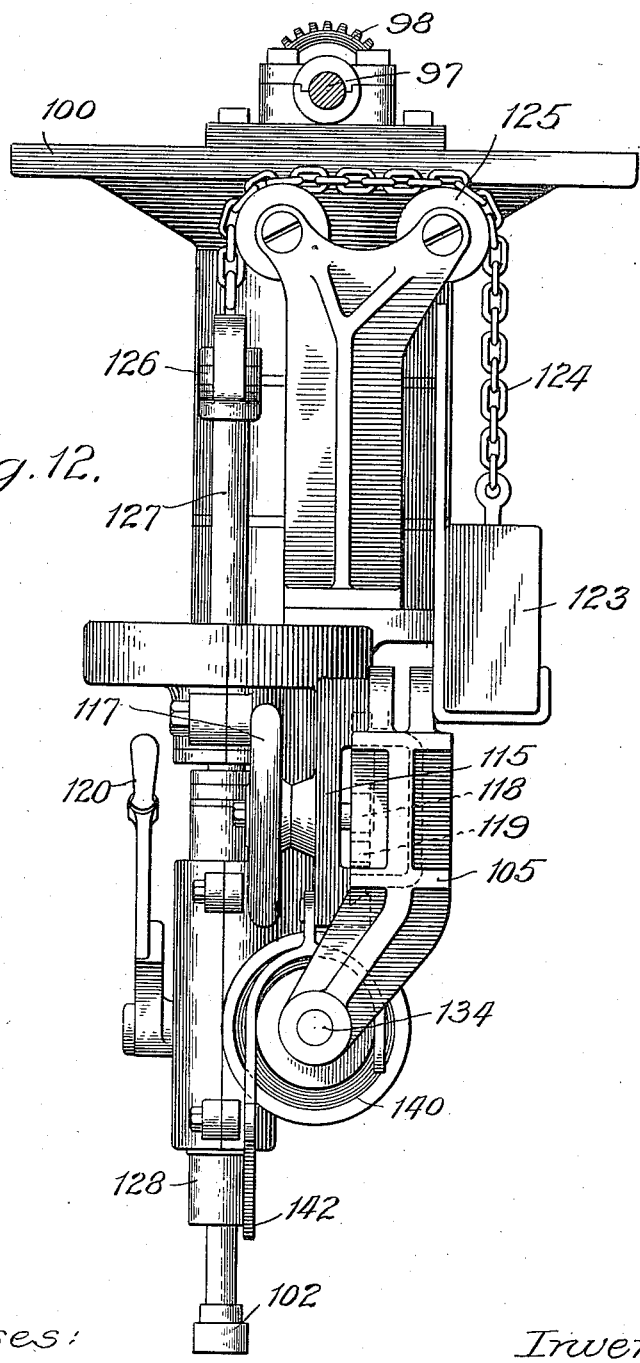

J. W. KENDRICK.
APPARATUS FOR PREPARING RAILWAY TIES.
APPLICATION FILED JAN. 27, 1911.
1,068,666.
Patented July 29, 1913.
13 SHEETS—SHEET 1.
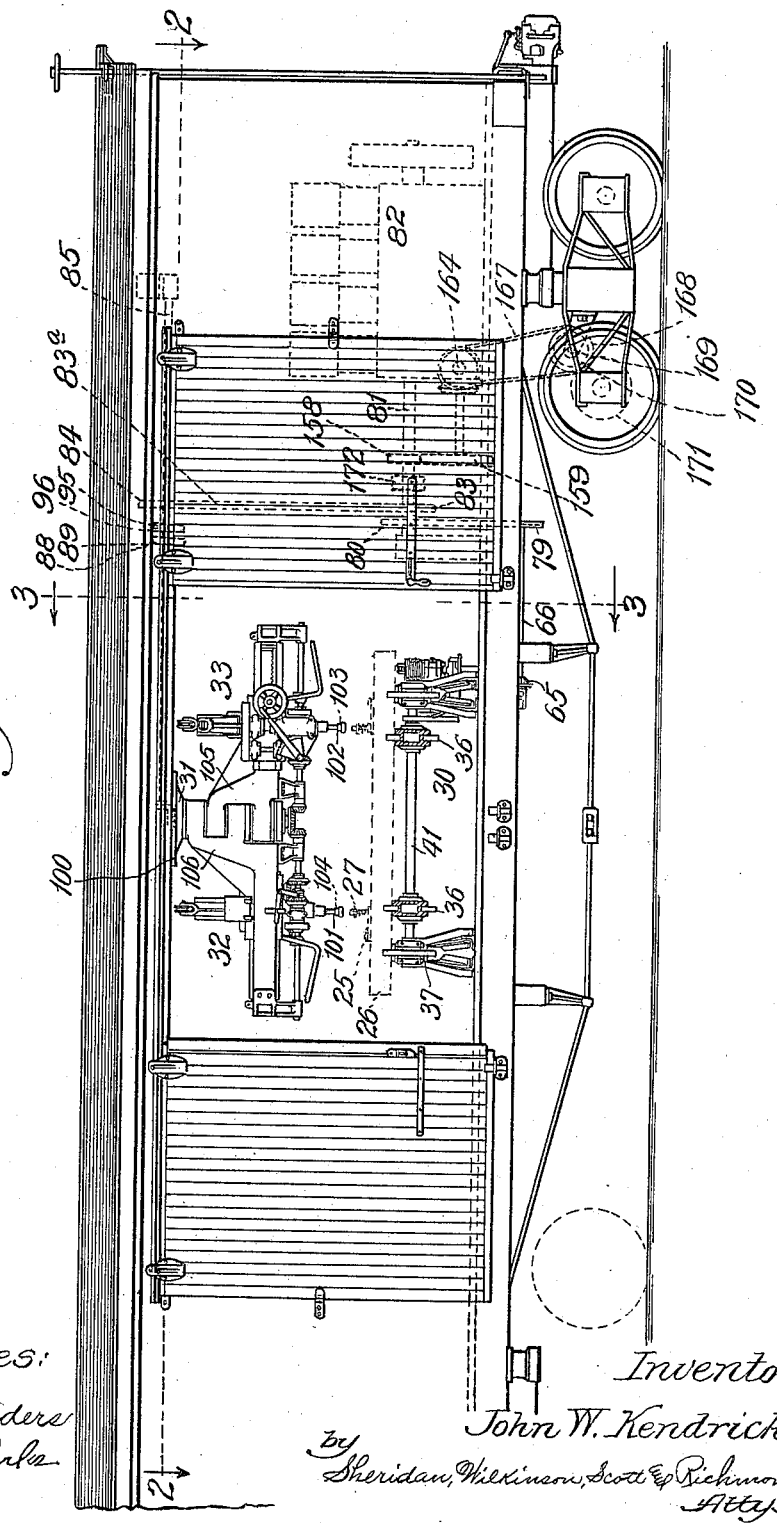

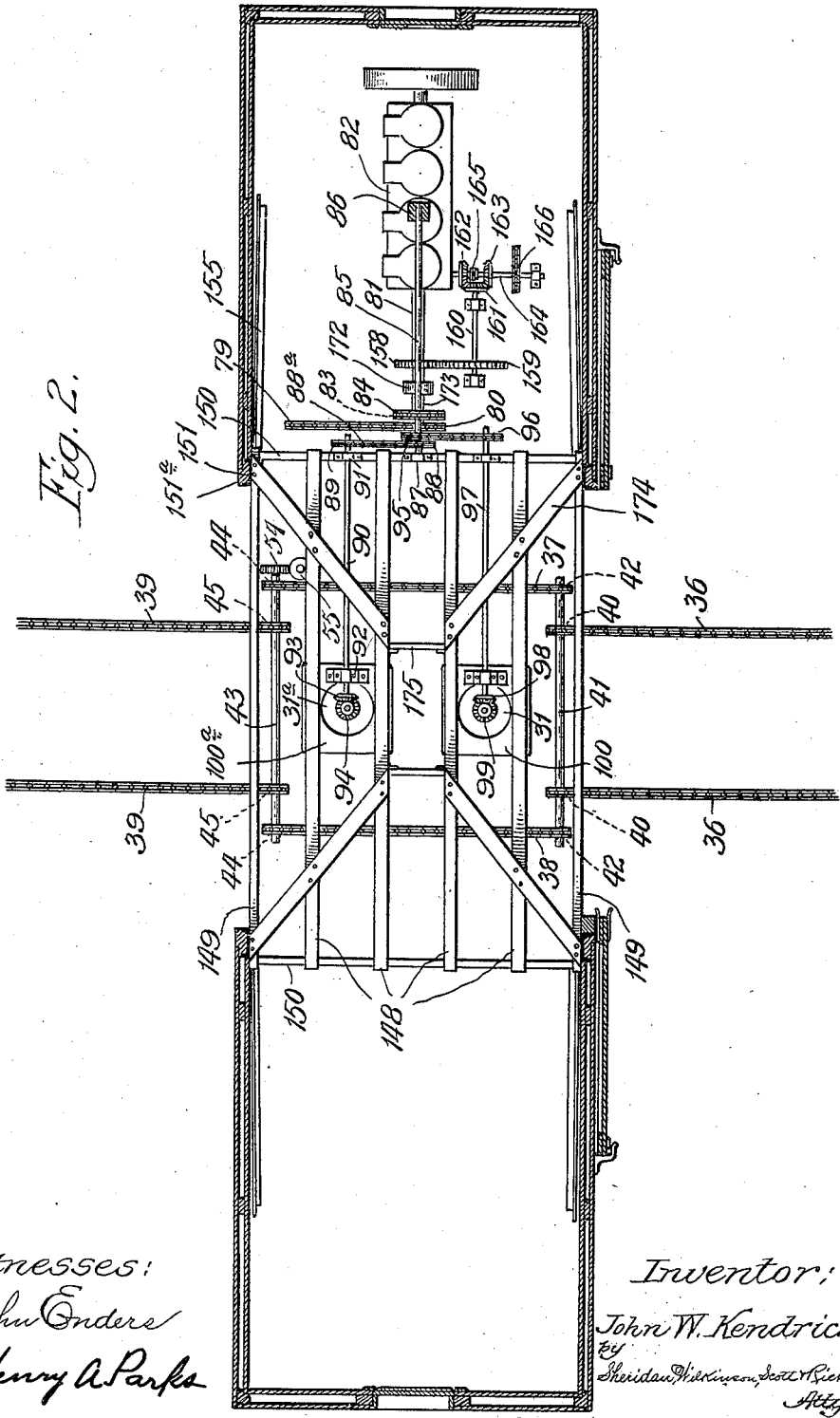

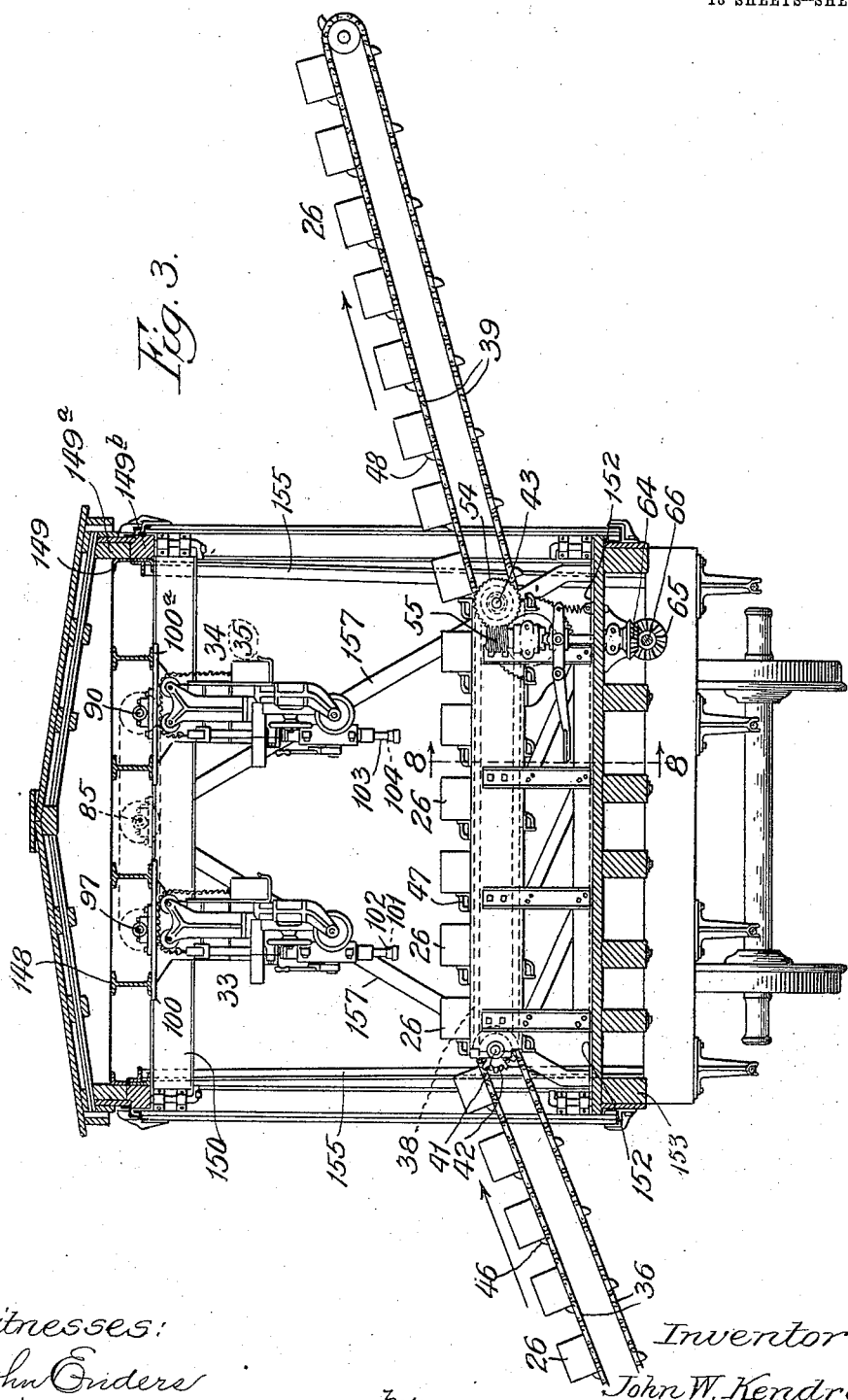

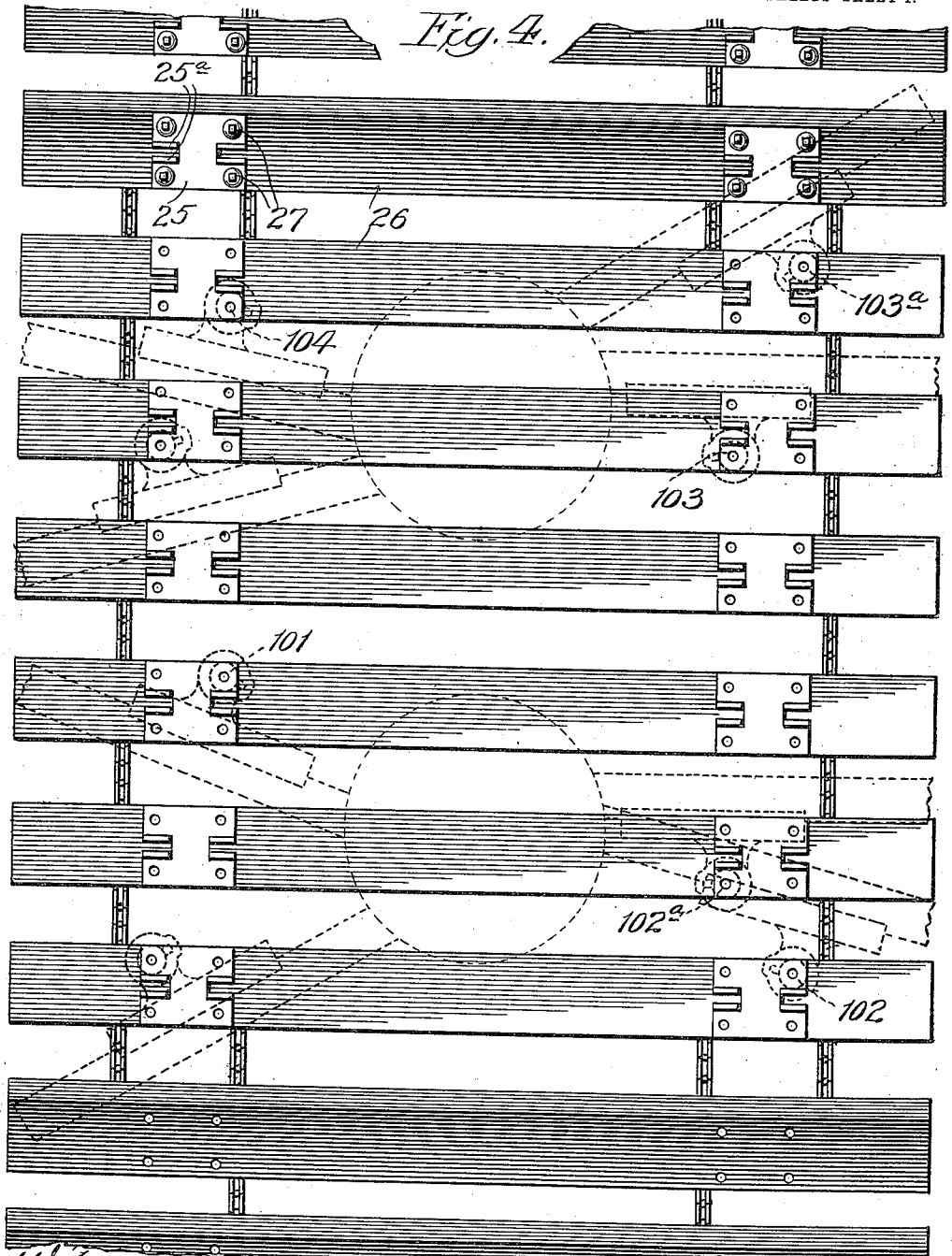

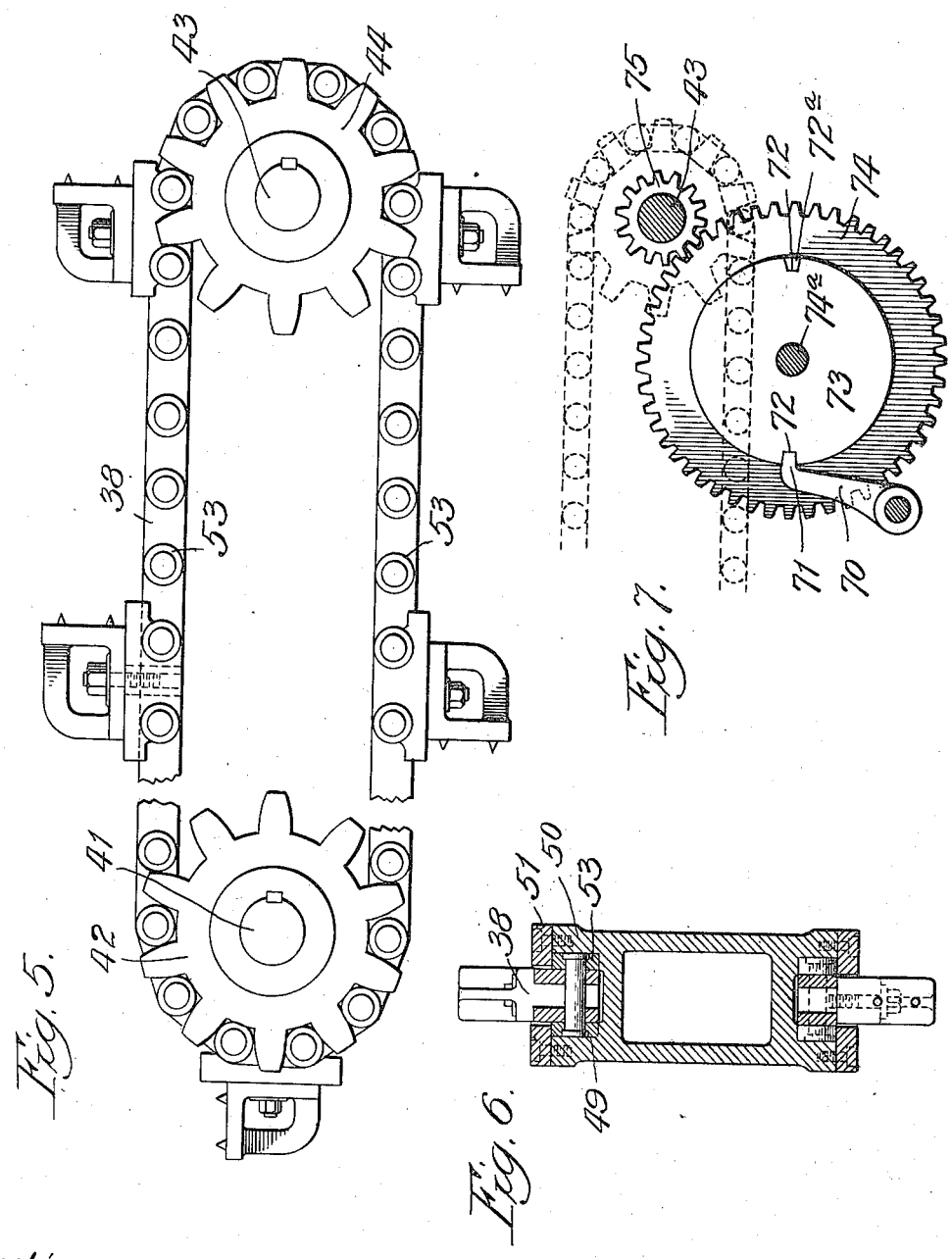

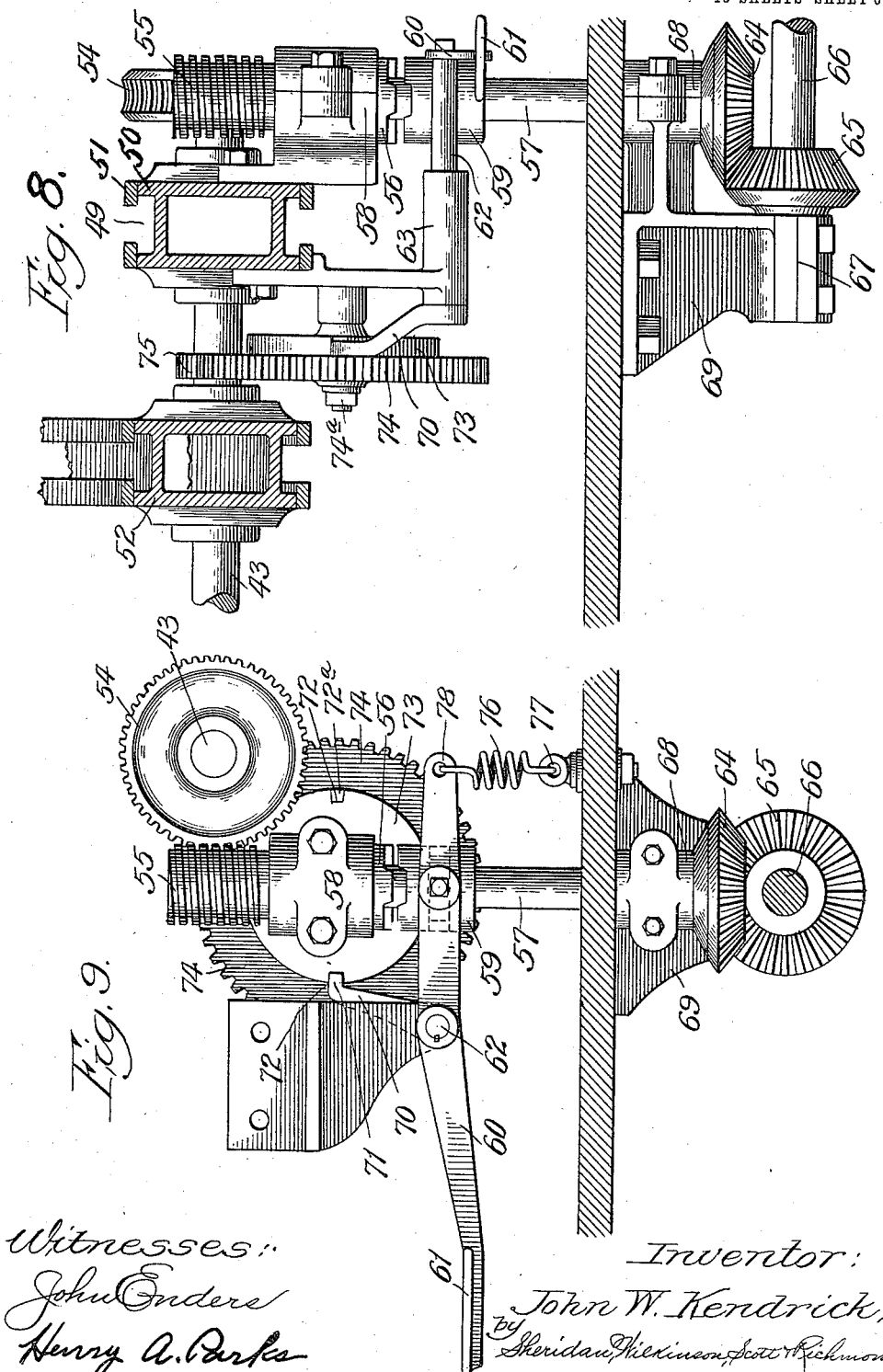

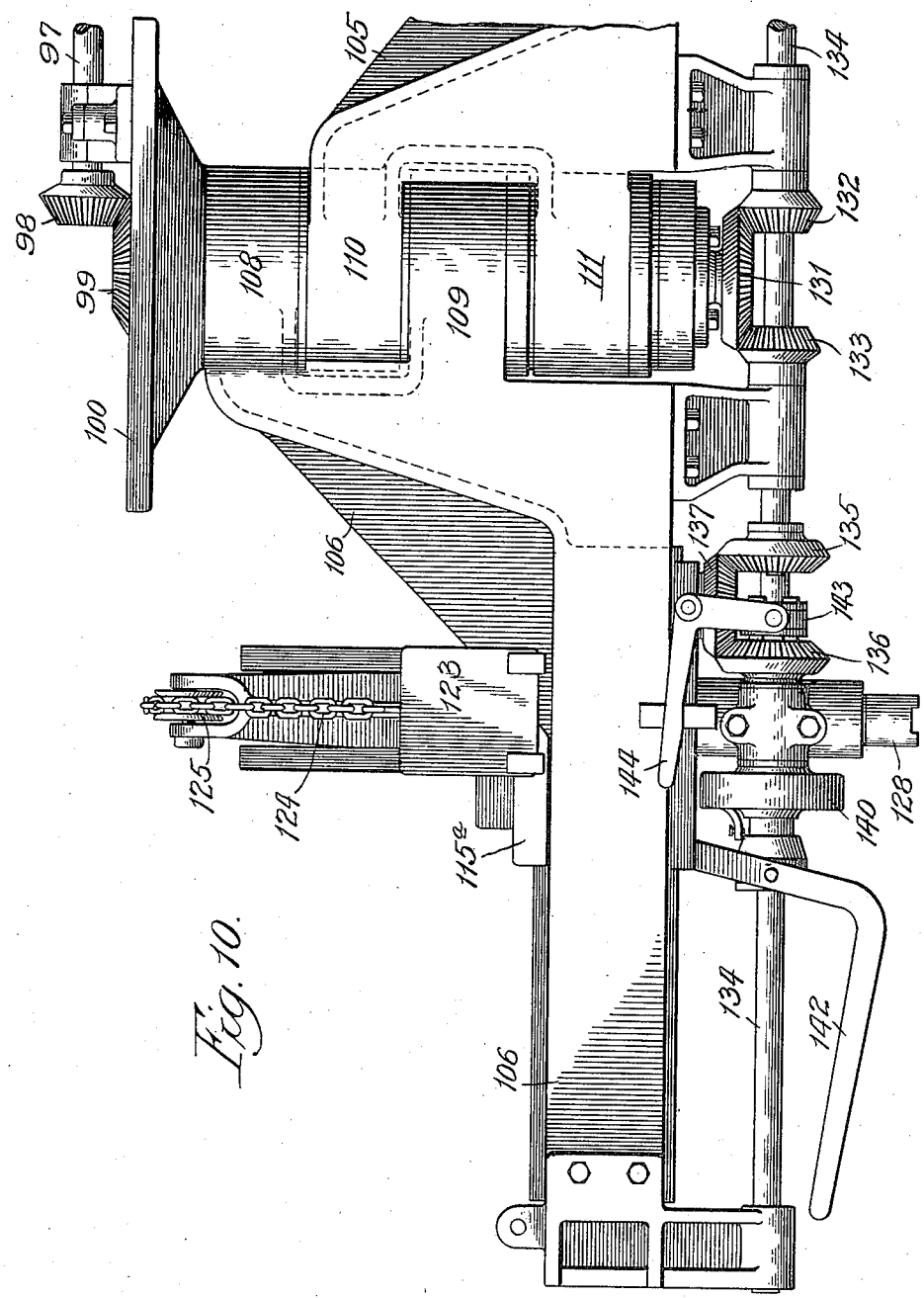

J. W. KENDRICK.
APPARATUS FOR PREPARING RAILWAY TIES.
APPLICATION FILED JAN. 27, 1911.
1,068,666.
Patented July 29, 1913.
13 SHEETS—SHEET 8.
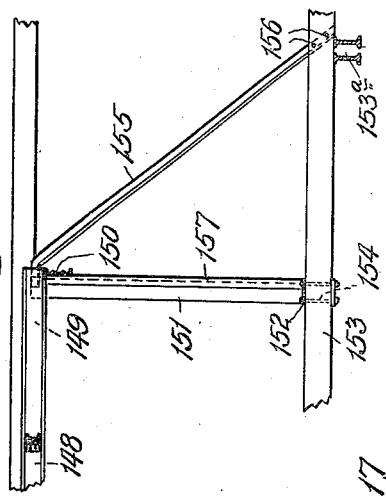
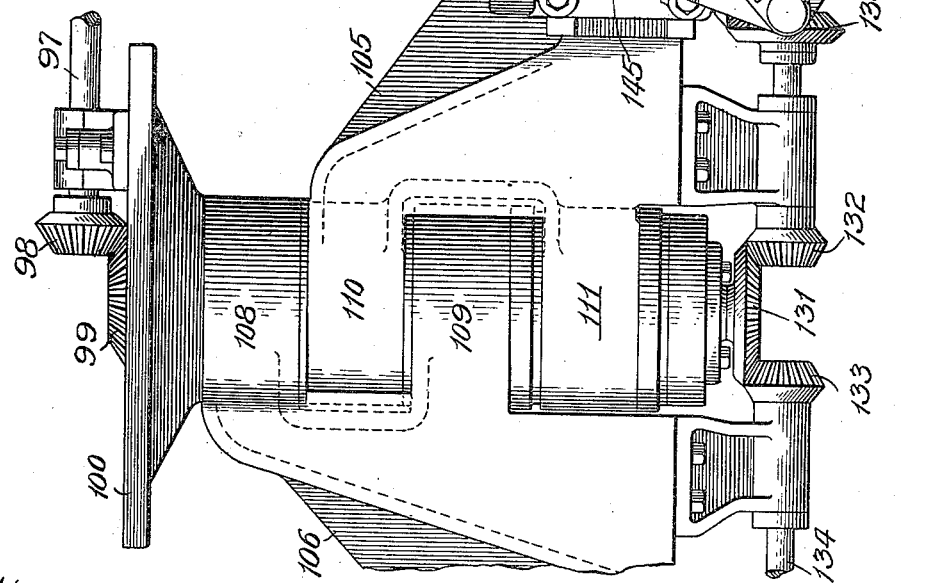
Witnesses:
John Enders
Henry A. Parks
Inventor:
John W. Kendrick,
by Sheridan, Wilkinson, Scott & Richmond
Attys.

J. W. KENDRICK.
APPARATUS FOR PREPARING RAILWAY TIES.
APPLICATION FILED JAN. 27, 1911.

1,068,666.

Patented July 29, 1913.

13 SHEETS—SHEET 9.

Witnesses:
John Enders
Henry A. Parks

Inventor:
John W. Kendrick,
by Sheridan, Wilkinson, Scott & Richmond
Attys.

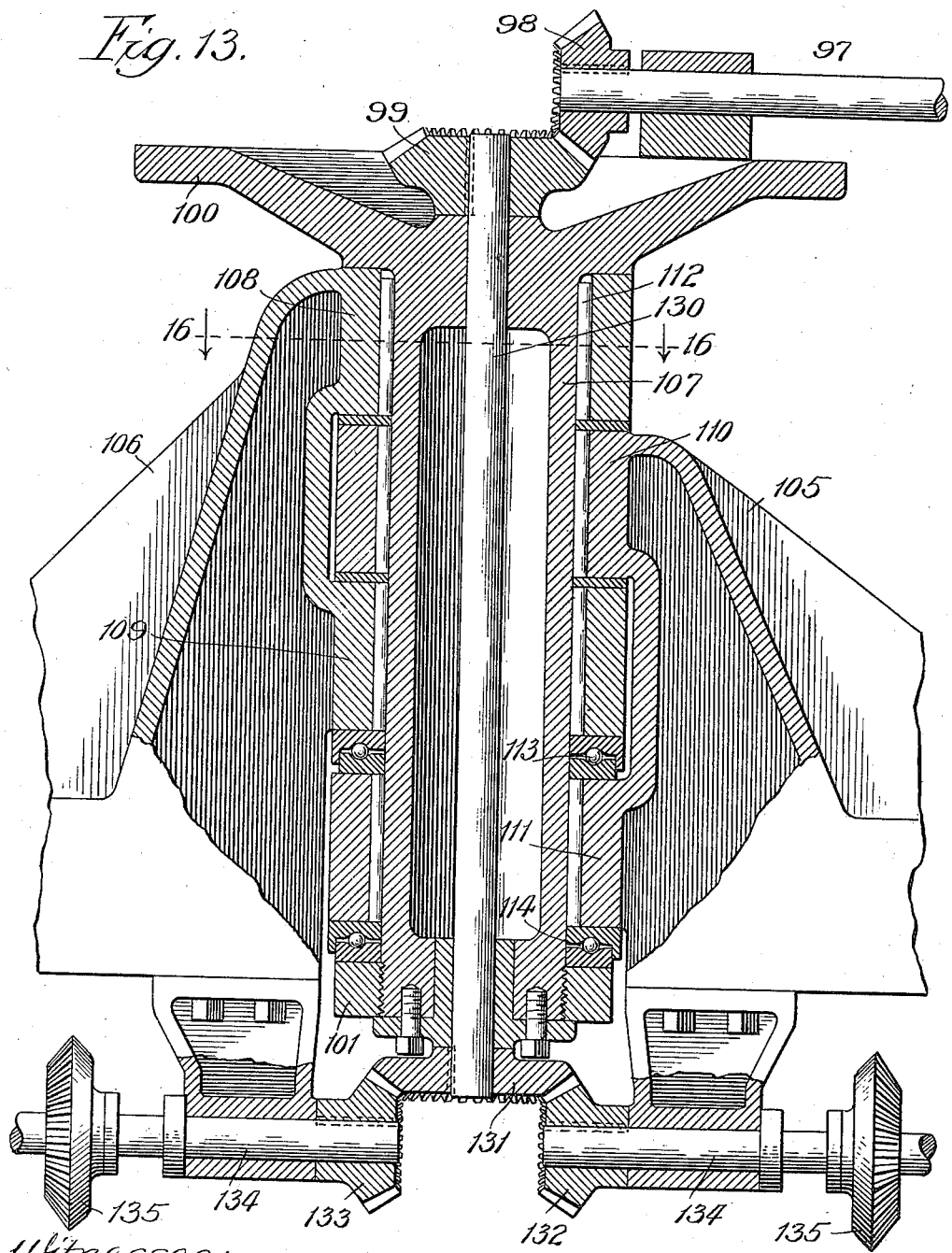

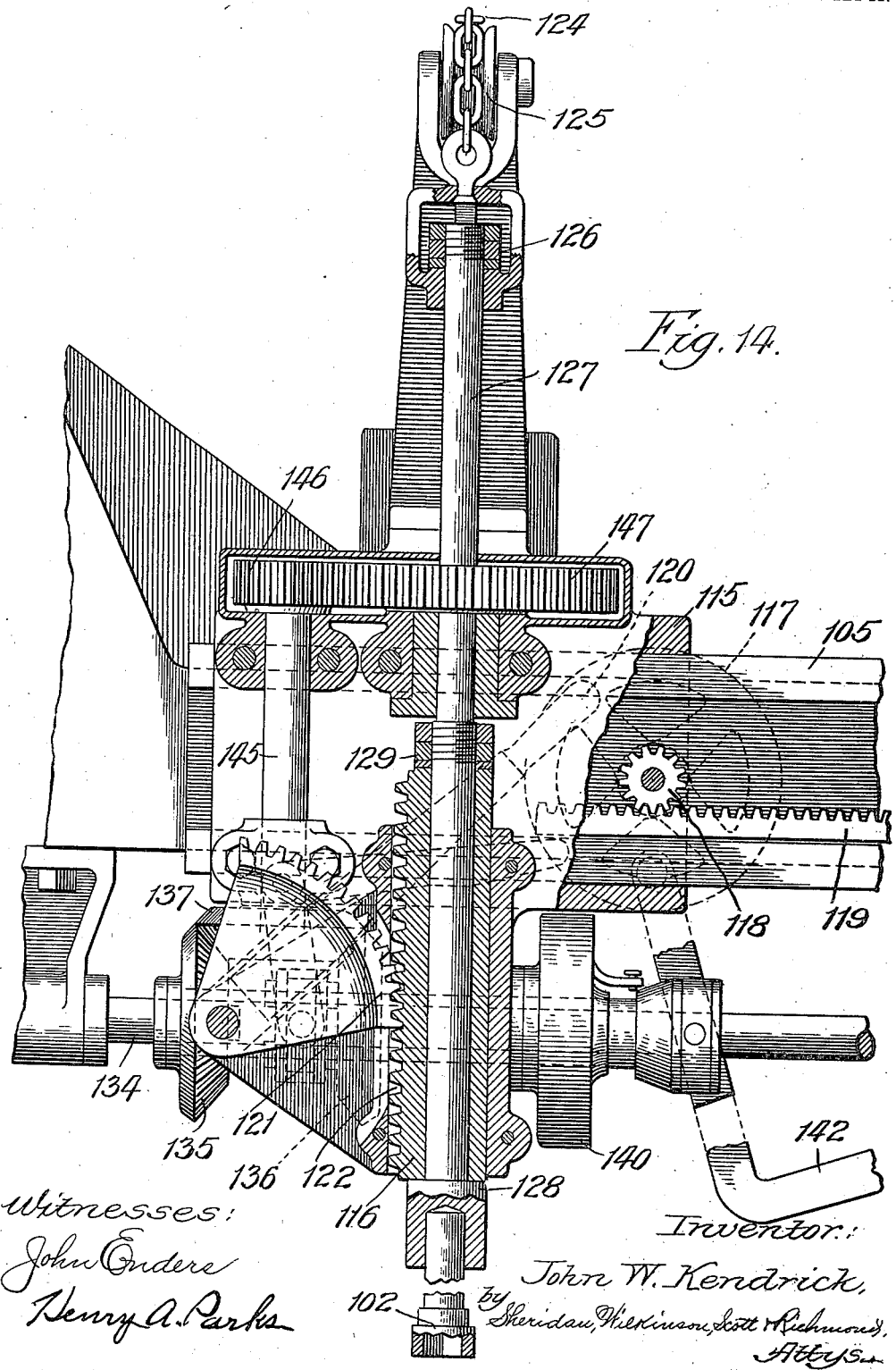

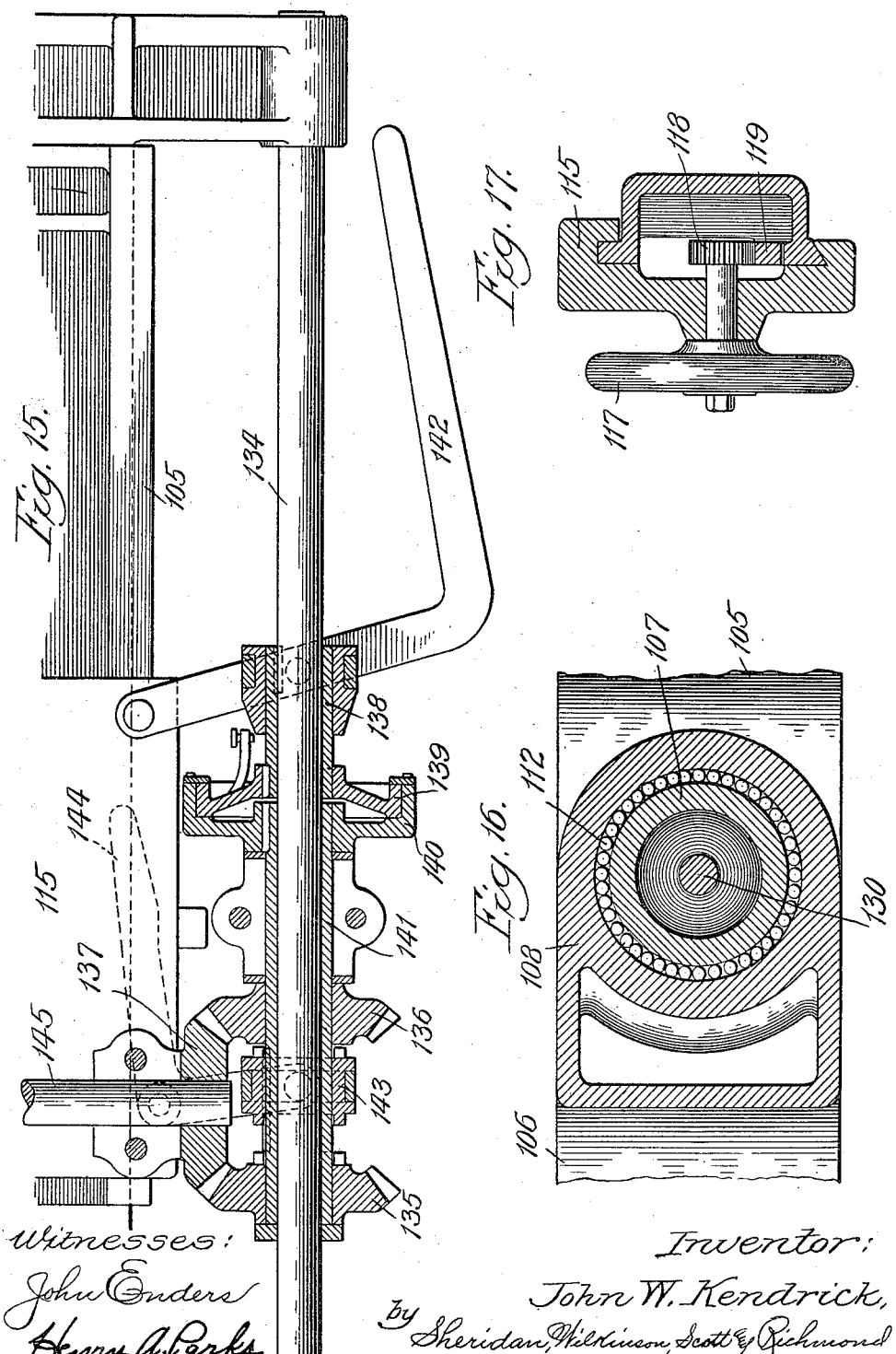

J. W. KENDRICK.
APPARATUS FOR PREPARING RAILWAY TIES.
APPLICATION FILED JAN. 27, 1911.
1,068,666.
Patented July 29, 1913.
13 SHEETS—SHEET 13.
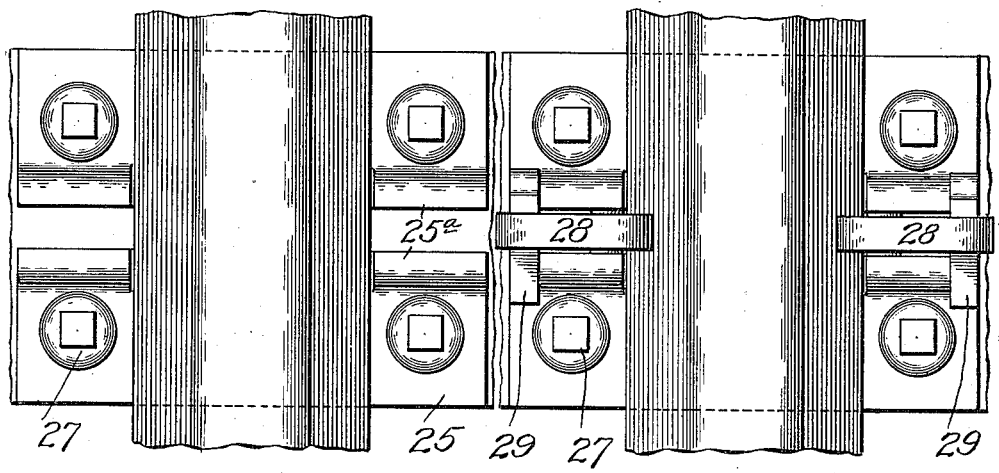
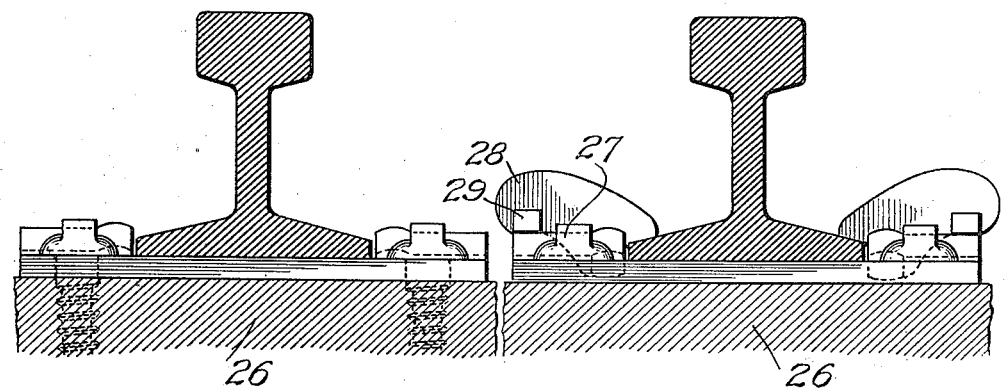
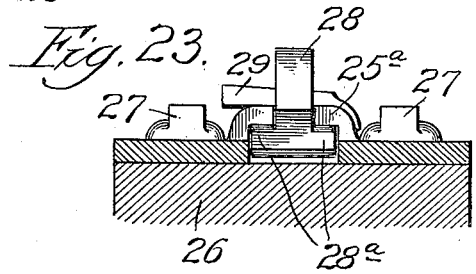
Witnesses:
John Endere
Henry A. Parks
Inventor:
John W. Kendrick,
by Sheridan, Wilkinson, Scott & Richmond
Attys.

UNITED STATES PATENT OFFICE.

JOHN W. KENDRICK, OF CHICAGO, ILLINOIS.

APPARATUS FOR PREPARING RAILWAY-TIES.

1,068,666.  Specification of Letters Patent.  Patented July 29, 1913.

Application filed January 27, 1911. Serial No. 605,010.

*To all whom it may concern:*

Be it known that I, JOHN W. KENDRICK, a citizen of the United States, residing at Chicago, in the county of Cook and State of Illinois, have invented certain new and useful Improvements in Apparatus for Preparing Railway-Ties, of which the following is a specification.

The object of my invention is to provide a tool car with spike-driving mechanism mounted thereon which will permit the securing of tie plates to said ties by the spikes previously to the laying of the ties upon the roadbed.

My invention is designed for use in connection with a new form of tie plate which I have invented, in which the rail may be secured to the tie plate by holding and locking devices subsequently to the attachment of the tie plate to the tie.

My invention is more particularly designed for use in connection with the driving of screw spikes, though the general principles of the mechanism employed are applicable with modifications to other forms.

In my present invention I preferably carry the ties transversely through the car by conveying mechanism, and during periods of rest in the movement through the car the tie plates are placed on the ties by the operators, the screw spikes are inserted in holes in said plates and ties and are driven by the spike-driving mechanism described in the following specification.

The ties are preferably prepared in the matters of scarfing, boring, and treating for the purpose of prolonging their time of service before they are passed through the car here described.

The above and other objects will be made more fully apparent in the following specification when taken in connection with the accompanying drawings, in which—

Figure 1 is a side elevation of a car with my improved spike-driving machinery mounted therein. Fig. 2 is a horizontal section of the same taken just beneath the roof of the car, substantially along the line 2—2 of Fig. 1. Fig. 3 is a cross section of the car taken substantially along the line 3—3 of Fig. 1. Fig. 4 is a plan view of a series of ties as they appear while passing through the car. Fig. 5 is a detail showing a portion of the conveying mechanism by which the ties are carried through the car. Fig. 6 is a cross section of the same, including the guides for the conveyer chain. Fig. 7 is a detail of the driving mechanism by which the above described conveyer chain is actuated. Fig. 8 is a detail view of a portion of the driving mechanism for said conveyer, taken substantially on the line 8—8 of Fig. 3. Fig. 9 is a side elevation of the same. Fig. 10 is an enlarged elevation of one of the spike-driving machines, showing more particularly its supporting arm and the central column to which it is pivotally attached. Fig. 11 is an enlarged elevation of another of the spike-driving machines, together with the arm which supports it and the same central column above mentioned, to which it is also pivotally attached. Fig. 12 is an end elevation of one of the spike-driving machines. Fig. 13 is a vertical sectional view of the central column and of the pivotal portion of the supporting arms. Fig. 14 is a vertical section, taken along the axis of the spindle of one of the spike-driving machines. Fig. 15 is a vertical section taken through the clutch mechanism which drives one of the spike-driving machines. Fig. 16 is a horizontal section of the central column taken along the line 16—16 of Fig. 13. Fig. 17 is a cross section through one of the supporting arms, taken substantially along the line 17—17 of Fig. 11 and showing chiefly the hand wheel feed for the radial movement of the tool carriage. Fig. 18 is a detail of the supporting framework of the spike-driving machine. Fig. 19 is a plan view of a portion of a rail resting upon one of the tie plates. Fig. 20 is a plan view of a rail resting upon one of the tie plates with the holding and locking devices in place. Fig. 21 is a cross section of the parts shown in Fig. 19. Fig. 22 is a cross section of the parts shown in Fig. 20; and Fig. 23 is a cross section of a tie and tie plate viewed at right angles to the rail and showing the holding and locking devices.

Referring more particularly to Figs. 1, 2 and 3 of the drawings, it will be seen that the conveying mechanism is disposed upon the floor of the car and is adapted to carry the ties transversely of the car through the door openings. The conveying mechanism is referred to generally by the numeral 30. It will also be seen that the spike-driving portion of the equipment is mounted in the upper portion of the car, and that it has a pendent position above the conveying mechanism. The spike-driving tools, which are actuated by the spike-driving mechanism, have positions at the lower extremities of said spike-driving mechanism, and are thus within convenient reach of the operators. The purpose of my invention is to provide mechanism in the car which will secure the tie plates 25 to the ties 26, by means of screw spikes 27.

Referring now more particularly to Figs. 4, 19, 20, 21, 22 and 23, it will be seen that the tie plates 25 are first placed upon the ties 26 with the holes for the spikes in register with the holes in the ties. The ties are previously prepared for the attachment of the tie plates. The tie plates and ties are ready at this time to receive the screw spikes 27, which are inserted in the said holes by the operators and driven by the spike-driving mechanism directly above. After the ties have had the tie plates secured to them in this manner, they are in condition to be laid upon the road-bed and to receive the rails. The rails are finally secured in place by holding devices 28, which are in turn locked in place by keys 29. The holding devices are provided with lugs 28$^a$ that are inserted beneath lugs 25$^a$ of the tie plates. The keys 29 support the outer portions of the holding devices 28 in place and cause the inner ends to firmly engage the rail.

Referring again to Figs. 1, 2 and 3, it will be seen that there are four spike-driving mechanisms which are referred to generally by the numerals 32, 33, 34 and 35. These spike-driving mechanisms are arranged in pairs, each pair being supported by separate central columns 31 and 31$^a$. The four spike-driving machines are arranged to drive the four tools 101, 102, 103 and 104.

Referring again to the conveying mechanism, it will be seen that there is a pair of conveyer chains, 36, 36, at one side of the car, which are adapted to carry the ties into the car in the directions indicated by the arrows. A similar pair of conveyer chains, 37, 38, occupies a horizontal position in the interior of the car and is adapted to receive the ties from the conveyer chains 36. The pair of conveyer chains 39, 39, is located at the opposite side of the car and is adapted to receive the ties from the chains 37 after the spike-driving operations have been completed and to remove the ties. The conveyer chains 36, 36, are driven by sprocket wheels 40, 40, mounted upon the shaft 41. This shaft also carries sprocket wheels 42, 42, which mesh with the chains 37, 37, and are driven thereby. The chains 37 also mesh with the sprocket wheels 44, 44, mounted upon the shaft 43 at the opposite side of the car. This shaft is the driving shaft for the conveying chains and receives its power from the motor 82 in one end of the car, through mechanism which will be described later. The shaft 43 also carries sprocket whels 45, which mesh with the conveyer chains 39 and are therefore adapted to drive said chains. The several conveyer chains are provided with lugs 46, 47, 48, &c., by which they engage the ties and insure a positive movement therewith. The chains are guided in channels 49 of supporting bars 50, and are retained in said channels by overlapping bars 51.

Reference numeral 52 refers to one of the chain guides which has an inclined position, such, for instance, as the one which supports the chain 39. Rollers 53 on the chains facilitate the smooth operation thereof.

At one extremity of the shaft 43 is fixedly mounted the worm wheel 54, which meshes with and is driven by the worm 55. This worm is fixed to or integral with a clutch member 56, and together they are loosely mounted upon and encircle a vertical shaft 57. The intermediate portion of the worm and clutch elements 55, 56, is mounted in a suitable bearing 58. An opposing clutch element 59 is slidably, but non-rotatively, mounted upon the shaft 57, and is adapted to be moved into and out of engagement with the clutch member 56 by the lever 60. This lever is provided with a treadle portion 61, by which the operator may move the clutch element 59 into engagement with the opposing clutch element 56. This lever is fixed to a pin 62, which, in turn, is supported in a bearing 63 suitably attached to the main frame.

The shaft 57 carries at its lower end a bevel gear 64, which meshes with and is driven by a bevel gear 65 carried by the horizontal shaft 66. This latter shaft is provided with a suitable bearing 67, and the vertical shaft 57 is provided with a bearing 68. The bearings 67 and 68 are supported by a bracket 69, suitably attached to the car frame. The shaft 66 receives power from a motor 82, through mechanism which will be described presently.

Upon the pin 62 is fixed an arm 70 having an inwardly disposed end 71 adapted to drop into notches 72 in the periphery of the disk 73. This disk is secured to a spur gear 74 in concentric relation, or it may be integral therewith. The spur gear 74 is loosely mounted upon a supporting pin 74$^a$ fixed to the framework. A spur pinion 75 meshes with and drives the spur gear 74, said pinion being fixed to the shaft 43. It will be seen that the disk will rotate as long as the shaft 43 rotates. When one of the notches 72 comes to a position adjacent the angularly disposed end of the lever 70, the said lever will drop into the notch because of the tension of the spring 76. This spring is attached at one end to an eye 77, secured to the floor of the car, and at the other end to the end 78 of the lever 60.

The shaft 66 carries a sprocket wheel 79 secured to it at one end, which meshes with and is driven by a chain leading from another sprocket wheel 80 fixed to the motor shaft 81. The motor 82 is suitably disposed in one end of the car. I preferably employ a gasolene engine for the purpose, though any other suitable motor may be used. The usual gasolene supply tank and other appurtenances necessary for the operation of the gasolene engine may be suitably disposed in the car about the motor, but I have not shown them in the drawings.

The motor 82 is connected with and adapted to drive three groups of mechanism. For convenience, these groups may include the spike-driving machinery, represented generally by the reference numerals 32, 33, 34, and 35, the conveying mechanism which carries the ties to positions which permit operation thereon by the spike-driving machines—and which is represented generally by the numeral 30—and, finally, the propelling mechanism for the car.

The connections by which the motor drives the conveying mechanisms have already been described. The connections with the spike-driving mechanism comprise the sprocket wheel 83, attached to the motor shaft 81 and adapted to drive a similar sprocket wheel 84, fixed to a shaft 85 mounted in the upper part of the car. A suitable driving chain 83ª transmits the power to said wheel 84. The shaft 85 is supported in suitable bearings 86 and 87 supported near the top of the car. Upon the shaft 85 are fixed the two sprocket wheels 88 and 95, which are connected by the following described mechanism with separate and independent portions of the spike-driving mechanism: The connection with one of these portions comprises a sprocket chain 88ª, leading from the wheel 88 to the wheel 89, fixed to the shaft 90. This shaft is supported in suitable bearings 91 and 92, attached to the framework in the upper part of the car, which will be described later. At one end of the shaft 90 is fixed the bevel gear 93, which meshes with and drives a similar bevel gear 94 attached to a central driving shaft in one of the portions of the spike-driving mechanism which will be described later. The sprocket wheel 95 is connected with a similar sprocket wheel 96, fixed to the shaft 97. This shaft carries a bevel gear 98, which meshes with and drives a similar gear 99 fixed to a central driving shaft in the other portion of the spike-driving mechanism.

The two portions of the spike-driving mechanism are separately attached to framework mounted in the central portion of the car near the roof, and dependent therefrom. One of said portions is provided with a central column having a flanged head or inverted base 100, which is attached to said framework. The other portion of said spike-driving machinery has a similar flanged head or inverted base 100ª, which is similarly attached to said framework. Two of the spike-driving tools, 101 and 102, are connected with and actuated by one portion of said spike-driving mechanism, and the other two tools, 103 and 104, are connected with and actuated by the other portion of said spike-driving mechanism. Taking now one of the spike-driving mechanisms, as shown on a larger scale in Figs. 10, 11, 12, 13 and 14, it will be seen that there are two radial arms, 105 and 106, pivotally attached to a common central column 107, which is provided with the said flanged head or inverted base 100 at its upper end. These radial arms are thus adapted to swing horizontally above the group of ties supported by the conveying mechanism and supporting mechanism in the lower part of the car previously described.

The radial arms are preferably provided with double intermeshing hubs, 108 and 109, and 110 and 111. Rollers 112 are placed in the bore of the hubs around the central column. Ball bearings 113 are placed between the lowermost portions of the hubs 109 and 111. Similar roller bearings 114 are placed between the lowermost hub 111 and a collar 107ª secured to the central column. On each of the radial arms 105 and 106 is placed a sliding head or tool carriage, such as shown at 115 in Fig. 11 and at 115ª in Fig. 10. These two carriages are adapted to slide along the arms and to be moved thereon by the operator by hand wheels 117. These hand wheels are provided with suitable mechanism, such as a pinion 118, which meshes with a rack 119 for causing the movement.

Each of the tools 101, 102, 103 and 104 may be elevated or depressed by a hand lever, such as shown at 120 in Fig. 14. This hand lever is adapted to actuate a segmental gear 121, which meshes with a rack 122, preferably integral with a vertical sliding sleeve 116, which is non-rotatively mounted in the head or tool carriage 115. Said sleeve 116 is counterbalanced by the counterweight 123 attached to the chain 124 which passes over the pulleys 125 and finally is attached to the vertical shaft 127 by a swivel connection 126. The vertical shaft 127 is provided at its lower extremity with a tool chuck or holder 128, which has a bearing upon the lower extremity of the sleeve 116. A suitable collar 129 is provided for preventing downward movements of the vertical shaft in said sleeve. The vertical shaft or spindle 127 is driven by a train of mechanism leading from the vertical central shaft 130 mounted in the central column 107, said mechanism being so arranged as to permit the various adjustments of the tools with relation to the spikes. The shaft 130 is driven by the bevel gears 98 and 99, previously described—see Fig. 13. At the lower extremity of the shaft 130 is fixed a bevel gear 131, which is adapted to drive the bevel gears 132 and 133. Each of the said latter gears is connected with one of the spike-driving tools. Taking the gear 132, it will be seen to be fixed to a shaft 134 mounted in suitable bearings upon the radial arm 105. This shaft 134 is adapted to drive a vertical shaft 145 through a clutch and reversing mechanism. The reversing mechanism comprises the two bevel gears 135 and 136 which mesh with the bevel gear 137 fixed to the shaft 145. The power of the shaft 134 is first imparted to a sleeve 138 fixed thereto, and which, in turn, carries a clutch member 139. This clutch member drives another clutch member 140 fixed to the sleeve 141. A hand lever 142 permits the operator to effect the engagement or disengagement of the clutch members 139 and 140. The sleeve 141 carries a sliding clutch member 143, which latter is non-rotatably engaged therewith. The sliding clutch member 143 is adapted to engage either of the bevel gears 135 or 136, and such engagement may be effected by the operator by means of the hand lever 144. At the upper end of the shaft 145 is fixed a spur gear 146, which meshes with and drives another spur gear 147, which is non-rotatively but slidably engaged with the spindle 127.

The above described mechanism leading from the central shaft 130 to the spindle 127 is adapted to transmit power to said spindle in various horizontal, radial, and vertical adjustments thereof. The reversing mechanism, comprising the gears 135 and 136, permits a reversal of the rotary motion of the spindle, which may be necessary when the direction of the motor is reversed, due to the necessity of propelling the car in different directions. The clutch 139, 140, permits a slipping of portions of the mechanism when the tool meets with excessive resistance, due, for instance, to the spike being driven home. Said clutch also controls the starting and stopping of said spike. The hand lever 120 permits the operator to elevate and depress the spindle 127. The hand lever 144 permits him to reverse the direction of the spindle.

The spike-driving mechanism is supported by the framework shown more particularly in Figs. 2, 3 and 18. This framework comprises longitudinal means, preferably I-beams 148, spaced apart and resting at their ends upon transverse beams 150, 150. These beams are preferably channel beams and are secured at their ends to the flanges of the upright channels 151. These channels are preferably four in number, located at either side of the door openings. I preferably fit them to the door-posts 151ª at the inner faces of said posts. These vertical channels 151 rest at their lower ends upon metal plates 152 secured to the sills 153 by bolts 154. The metal plates 152 preferably are disposed transversely of the car and extend from one side sill to the other. When thus arranged they serve as important structural members of the framework, as well as base members, which framework is supported by the floor and side sills.

Diagonal members 157, preferably angle bars, are attached at their upper ends to the transverse channels 150, adjacent the middle thereof, and at their lower ends to the vertical channels 151. They therefore serve as important brace members for providing rigidity in the framework. Other inclined brace members 155, preferably angle bars, are attached to the beams 149 at their upper ends and to the side sills 153 at their lower ends. They preferably are attached to the side sills at a point adjacent the bolsters 153ª. Referring again to the longitudinal beams 148 at the top of the car, it will be seen that the four intermediate members 148 are preferably I-beams, while the two outer beams 149 are preferably channel beams having their webs disposed flatwise against the side plates 149ª and door frame members 149ᵇ.

It will be seen that I have provided a very rigid framework for supporting the spike-driving mechanism and that the said framework transmits the weight thereof to the side sills and to the bolsters without causing undue stress upon the upper portion of the car body.

The propelling mechanism for the car comprises a spur gear 158 fixed upon the motor shaft 81, and which meshes with and drives a spur gear 159, fixed upon a shaft 160. The latter shaft carries at one end a bevel gear 161, which meshes with and drives either of two bevel gears 162 or 163. Either of these two gears may be non-rotatively secured to the shaft 164 by a suitable clutch 165. The shaft 164 carries a sprocket wheel 166 which drives a chain 167, which, in turn, drives a sprocket wheel 168, secured to a shaft 169. This shaft carries a spur gear 170, meshing with a spur gear 171 secured to the axle of the car.

A clutch 172 is suitably attached to the motor shaft 81 for the purpose of permitting the engagement and disengagement of said motor shaft with a short shaft 173 in alinement with said motor shaft. By means of this clutch all of the conveying and spike-driving machinery may be disconnected from the motor when it is desired to propel the car for any considerable distance along the track. In like manner the clutch 165 may be adjusted to such position as will disconnect both of the gears 162 and 163 from the gear 161. The propelling mechanism will then be disconnected from the motor.

The framework to which the central columns 107 are attached at their upper ends is rendered rigid in a horizontal direction by diagonal members 174, secured to the inner beams 148 and to the outer beams 149 at the ends of the latter. The inner beams are rigidly connected by tie bars 175.

The bars 51—Figs. 6 and 8—support the ties while they are being moved into position by the conveyer chains, and also while the spikes are being driven.

In the operation and use of my improved spike-driving car, the operators are preferably arranged on either side of the conveying mechanism within easy reach of the controlling mechanism connected with the four spike-driving tools 101, 102, 103 and 104, when they place the tie plates upon the ties and cause said tools to drive the spikes through the plates and into the ties. One of these operators may give his attention to the mechanism which controls the movement of the conveyer. In controlling the conveyer he uses the treadle 61. In pressing on this treadle with his foot the tension of the spring 76 is overcome and the clutch members 59 and 56 become engaged. The conveying mechanism is then in operative connection with the motor and the conveying mechanism is started. As soon as the conveying mechanism has begun to move, the operator discontinues the pressure of his foot on said lever and the clutch is held in engagement by the arm 70, which rides at its end upon the periphery of the moving disk 73. It is held in this position until one of the notches 72 in said periphery reaches the angularly disposed end 71 of said arm, when the latter drops into said notch. This movement permits the spring 76 to restore the treadle 61 to its normal position, thereby causing the clutch members 59 and 56 to become disengaged. The conveying mechanism will then stop. The semicircumference of the disk 73, leading from one of the notches 72 to the other, is of sufficient length to permit the feeding of three ties to positions beneath the spike-driving machines. If it be desired to have a greater number of ties beneath the spike-driving machines at the same time, one of the notches 72 may be filled with a small block 72ª. The disk 73 will then make a full revolution before the arm 70 will drop into the remaining notch. Twice as many ties will then be fed to the car, and in the mechanism shown in the drawings six ties will be thus fed. The spike-driving tools may be adjusted horizontally in a circular direction substantially at right angles to the ties by swinging the radial arms 105, 106, &c., bodily about their central supporting columns 107. The said tools may be adjusted in a radial direction toward or away from the ends of the ties by rotating the hand wheels 117. This will cause the tool carriages 115 to slide along the radial arms.

The tools may be adjusted in a vertical direction by means of the hand levers 120. Each of the tools may be started and stopped by means of the hand levers 142. The rotary motion of each of the tools may be reversed by means of the levers 144. Varying degrees of pressure and driving force may be exerted upon the spikes by manipulating the levers 142.

When it is desired to move the car from place to place, the clutch 172 may be placed in condition to disconnect the motor from the spike-driving mechanism and the conveying mechanism. If the distance to be traveled is not great, it is not necessary to thus disconnect the motor. By manipulating the clutch 165 in one direction or the other the car may be caused to move in either direction.

While I have described my invention with more or less minuteness and as being embodied in certain precise forms, yet I do not wish to be understood as limiting myself unduly thereto. On the contrary, I contemplate changes in form and the proportion of parts, and the substitution of equivalents, as circumstances may suggest or render expedient without departing from the spirit of my invention.

I claim:—

1. In a car, spike-driving mechanism carried by said car for operating upon a plurality of ties simultaneously, means carried by said car for supporting said ties in position to receive spikes driven by said mechanism, means having periods of movement of variable length for conveying a variable number of ties to said position, means under the control of the operator for starting said conveying means, and adjustable means for automatically stopping said motion after either of the periods thereof of said variable length.

2. In a car of the class described, means for conveying a variable number of ties to positions on said car for receiving spikes, a series of pairs of spike-driving tools disposed in operative relation to the end portions of said ties, means controlled by the operator for starting said conveying means, means for automatically stopping said conveying means, and means for changing the movement of said conveying means between starting and stopping thereof, to carry said variable number.

3. In a machine of the character described, a car, spike driving mechanism carried thereby adapted to drive spikes into ties supported by said car, said mechanism comprising spike engaging tools, a pair of horizontally swinging arms in the upper part of the body of said car mounted to swing in the same plane, and adapted to support said tools respectively, and a common central column to which said arms are pivoted.

4. In a machine of the character described, a car, spike driving mechanism carried thereby adapted to drive spikes into ties supported by said car, said mechanism comprising spike engaging tools, a pair of horizontally swinging arms in the upper part of the body of said car mounted to swing in the same plane, and adapted to support said tools respectively, a common central column to which said arms are pivoted, and driving means mounted in said column and operatively connected with both said tools.

5. In a machine of the character described, a car, spike driving mechanism carried thereby adapted to drive spikes into ties supported by said car, said mechanism comprising spike engaging tools, a pair of horizontally swinging arms in the upper part of the body of said car mounted to swing in the same plane and adapted to support said tools respectively, a common central column to which said arms are pivoted, driving means mounted in said column and operatively connected with both said tools, and means on each of said arms for disconnecting the tool on said arm from said driving means independently of the tool on the other arm.

6. In a machine of the character described, a car, spike driving mechanism carried thereby adapted to drive spikes into ties supported by said car, said mechanism comprising spike engaging tools, a pair of horizontally swinging arms in the upper part of the body of said car mounted to swing in the same plane and adapted to support said tools respectively, a common central column to which said arms are pivoted, driving means mounted in said column and operatively connected with both said tools, means on each of said arms for disconnecting the tool on said arm from said driving means independently of the tool on the other arm, and means on each of said arms for reversing the direction of rotation of the tool on said arm independently of the tool on the other arm.

7. In a machine of the character described, a car, spike driving mechanism carried thereby adapted to drive spikes into ties supported by said car, said mechanism comprising spike engaging tools, a pair of horizontally swinging arms in the upper part of the body of said car mounted to swing in the same plane and adapted to support said tools respectively, a common central column to which said arms are pivoted, driving means mounted in said column and operatively connected with both said tools, means on each of said arms for disconnecting the tool on said arm from said driving means independently of the tool on the other arm, means on each of said arms for reversing the direction of rotation of the tool on said arm independently of the tool on the other arm, said tools being adjustable horizontally and vertically on said arms, and means for conveying ties to positions beneath said tools.

8. In a machine of the character described, a car, spike driving mechanism carried thereby adapted to drive spikes into ties supported by said car, said mechanism comprising spike engaging tools, a pair of horizontally swinging arms in the upper part of the body of said car mounted to swing in the same plane and adapted to support said tools respectively, a common central column to which said arms are pivoted, driving means mounted in said column and operatively connected with both said tools, means on each of said arms for disconnecting the tool on said arm from said driving means independently of the tool on the other arm, means on each of said arms for reversing the direction of rotation of the tool on said arm independently of the tool on the other arm, said tools being adjustable horizontally and vertically on said arms, means for conveying ties to positions beneath said tools, said means having intermittent movements, starting means for said conveying means under control of the operator, and automatic stopping means for said conveying means to cause the ties to be brought to a position beneath said tools.

9. In a machine of the character described, a car, spike driving mechanism carried thereby adapted to drive spikes into ties supported by said car, said mechanism comprising spike engaging tools, a pair of horizontally swinging arms in the upper part of the body of said car mounted to swing in the same plane and adapted to support said tools respectively, a common central column to which said arms are pivoted, driving means mounted in said column and operatively connected with both said tools, means on each of said arms for disconnecting the tool on said arm from said driving means independently of the tool on the other arm, means on each of said arms for reversing the direction of rotation of the tool on said arm independently of the tool on the other arm, said tools being adjustable horizontally and vertically on said arms, means for conveying ties to positions beneath said tools, said means having intermittent movements, starting means for said conveying means under control of the operator, automatic stopping means for said conveying means to cause the ties to be brought to a position beneath said tools, means for receiving ties from variable heights and conveying them into said car, and means for discharging said ties at variable heights.

In testimony whereof, I have subscribed my name.

JOHN W. KENDRICK.

Witnesses:
 EDWARD PASSON,
 CARL A. RICHMOND.

Copies of this patent may be obtained for five cents each, by addressing the "Commissioner of Patents, Washington, D. C."